United States Patent [19]
Gonzalez

[11] Patent Number: 4,971,094
[45] Date of Patent: Nov. 20, 1990

[54] SAFETY VALVE SYSTEM

[76] Inventor: Ernest R. Gonzalez, 33761 The Street of the Blue Latern, Dana Point, Calif. 92629

[21] Appl. No.: 451,751

[22] Filed: Dec. 15, 1989

[51] Int. Cl.$^5$ ............................................. F16K 17/36
[52] U.S. Cl. ..................................... 137/38; 137/557; 251/66; 251/129.04
[58] Field of Search ................... 137/38, 39, 557, 45; 251/66, 129.04

[56] References Cited

U.S. PATENT DOCUMENTS

| | | | |
|---|---|---|---|
| 3,805,818 | 4/1974 | Yamada | 137/38 |
| 3,994,359 | 11/1976 | Smitley | 137/38 X |
| 4,103,697 | 8/1978 | Kiesow | 137/45 |
| 4,726,055 | 2/1988 | Smith | 251/129.04 X |
| 4,777,383 | 10/1988 | Waller | 137/557 X |

FOREIGN PATENT DOCUMENTS

| | | | |
|---|---|---|---|
| 51234 | 4/1980 | Japan | 137/38 |
| 155973 | 12/1980 | Japan | 137/38 |
| 5132 | of 1914 | United Kingdom | 137/45 |

Primary Examiner—Robert G. Nilson
Attorney, Agent, or Firm—Loyal M. Hanson

[57] ABSTRACT

A valve includes a housing having an inlet, an outlet, and a passageway that connects the inlet and the outlet in fluid communication. A valve member on the housing for opens and closes the passageway and an actuator on the housing that is responsive to movement such as may accompany an earthquake causes the valve member to close the passageway automatically in the event of such movement. The actuator may include a spring for driving the valve member from an open position to a closed position, and a trigger mechanism responsive to movement such as may accompany an earthquake for holding the valve member in the open position until the occurrence of such movement and then enabling the valve member to move to the closed position under influence of the driving means. A solenoid may also be provided on the housing for moving the valve member from the closed position to the open position in order to reopen the passageway, and a battery-powered microprocessor may be included on the housing for enabling a user to control the solenoid with a central computer that communicates over telephone lines with a plurality of valves located throughout the community.

22 Claims, 2 Drawing Sheets

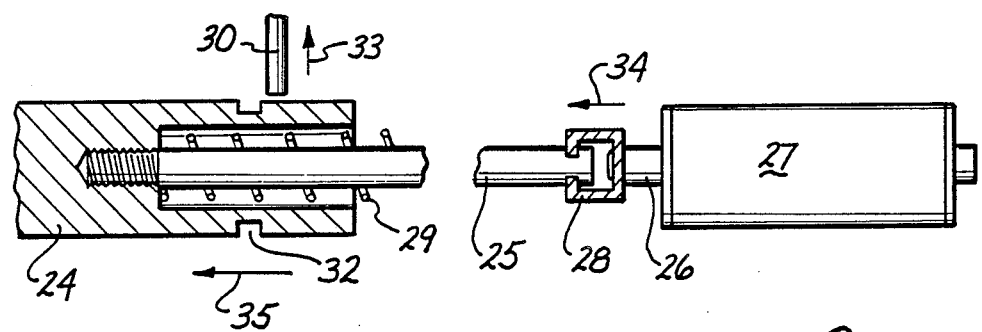
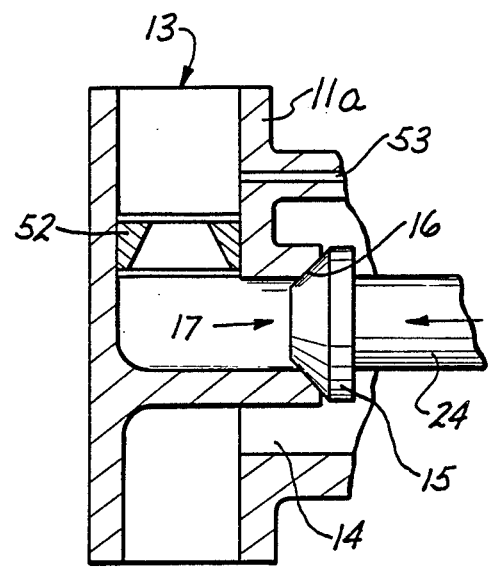
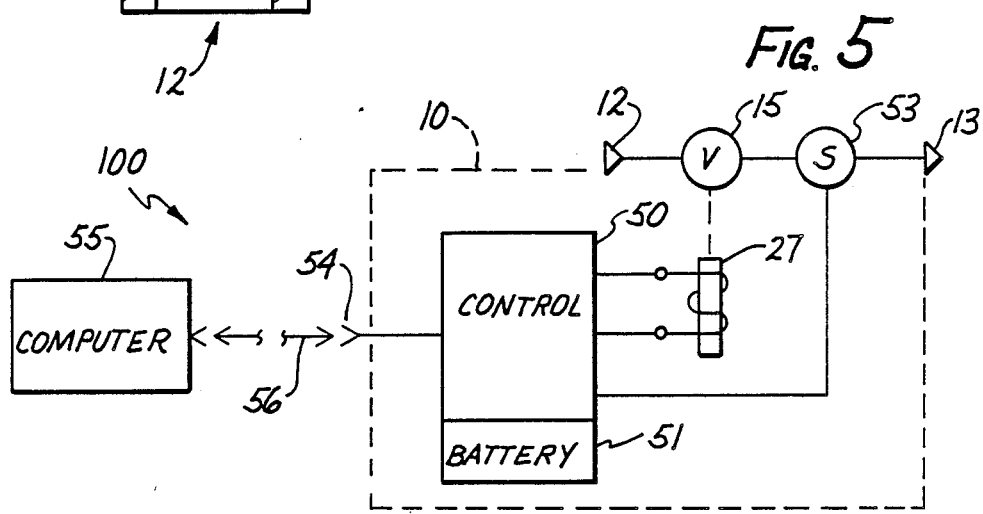

SAFETY VALVE SYSTEM

BACKGROUND OF THE INVENTION

1. Technical Field

This invention relates generally to valves, and more particularly to a safety valve for such applications as closing a natural gas line under earthquake conditions.

2. Background Information

Natural gas usually flows under pressure through somewhat sturdy municipal gas mains to the customer site. Then it flows through a gas meter into customer lines and through those lines to various gas-consuming devices That arrangement presents certain problems, however, for although the gas mains may remain intact during an earthquake, the more vulnerable gas meters, customer lines, and gas-consuming devices often rupture. That poses a significant threat to the community and so we need some way to alleviate the problem.

SUMMARY OF THE INVENTION

This invention solves the problem outlined above by providing a safety valve for insertion between the gas main and the gas meter. The safety valve closes automatically in response to the movement accompanying an earthquake so that it prevents natural gas leakage even though the earthquake damages the gas meter, the customer lines, the gas-consuming devices, or any other downstream component. In addition, it may be configured for use with liquid propane installations such as those commonly used in rural areas or with recreational vehicles, or it may be configured for use with hazardous chemicals and gases such as those used for various industrial purposes.

A preferred embodiment of the invention enables remote monitoring and control. It includes electronic control circuitry with which a user can perform various functions such as monitoring gas pressure, determining valve state (open or closed), and changing valve state when desired. Several valves in communication with a central computer constitute a safety valve system constructed according to the invention, the central computer preferably communicating with the safety valves over telephone lines.

The safety valve system advantageously monitors gas pressure so that individual valve closures and failures are known. Only affected valves need to be serviced instead of checking all valves. In addition, CMOS components may be included to provide extremely low power requirements. That may be particularly important in hazardous environments under spark suppression conditions. Low power also allows battery back-up exceeding ten years for temporary loss of power. A simple command set may be used in conjunction with suitable microprocessor circuitry in the valve so that all commands and update information can be sent over custom emergency telephone lines, thereby providing rapid access to all valves, and the microprocessor may include a reprogrammable VLSI memory so that upgrades can be made over the telephone lines, thereby eliminating individual field service for new versions.

Generally, a valve constructed according to the invention includes a housing having an inlet, an outlet, and a passageway that connects the inlet and the outlet in fluid communication. A valve member is provided on the housing for opening and closing the passageway. Valve member actuation means responsive to movement such as may accompany an earthquake is also provided on the housing for causing the valve member to close the passageway automatically in the event of such movement.

The valve member actuation means may include driving means (such as a spring) for driving the valve member from an open position to a closed position, and means defining a trigger mechanism responsive to movement such as may accompany an earthquake. The trigger mechanism holds the valve member in the open position until the occurrence of such movement and then it enables the valve member to move to the closed position under influence of the spring or other driving means.

For those purpose, the trigger mechanism may include a retainer member for retaining the valve member in the open position. The retainer member is mounted on the housing for movement between a first position in which it restrains the valve member from moving to the closed position under influence of the driving means and a second position in which it does not so restrain the valve member. A body of material is mounted on the housing for movement relative to the housing in response to movement such as may accompany an earthquake, and it is coupled to the retainer member so that the retainer member moves to the second position in the event of such movement. Of course, the valve member then moves to the closed position.

According to another aspect of the invention, the valve includes a solenoid on the housing for moving the valve member from the closed position to the open position in order to reopen the passageway. For that purpose the valve may also include suitable control circuitry, such as a battery-powered microprocessor, that enables a user to control the solenoid remotely. A sensor device may be included also so that the user can monitor the pressure of a fluid in the passageway. Furthermore, the microprocessor can be configured to enable communication with a central computer over telephone lines.

BRIEF DESCRIPTION OF THE DRAWINGS

FIG. 3 is a further enlarged view of a portion of FIG. 2 showing triggering of the valve member;

FIG. 4 is further enlarged view of a portion of FIG. 2 showing the valve member in the closed position; and FIG. 5 is a diagrammatic representation of a safety valve system constructed according to the invention.

DESCRIPTION OF THE PREFERRED EMBODIMENTS

Figure 1:
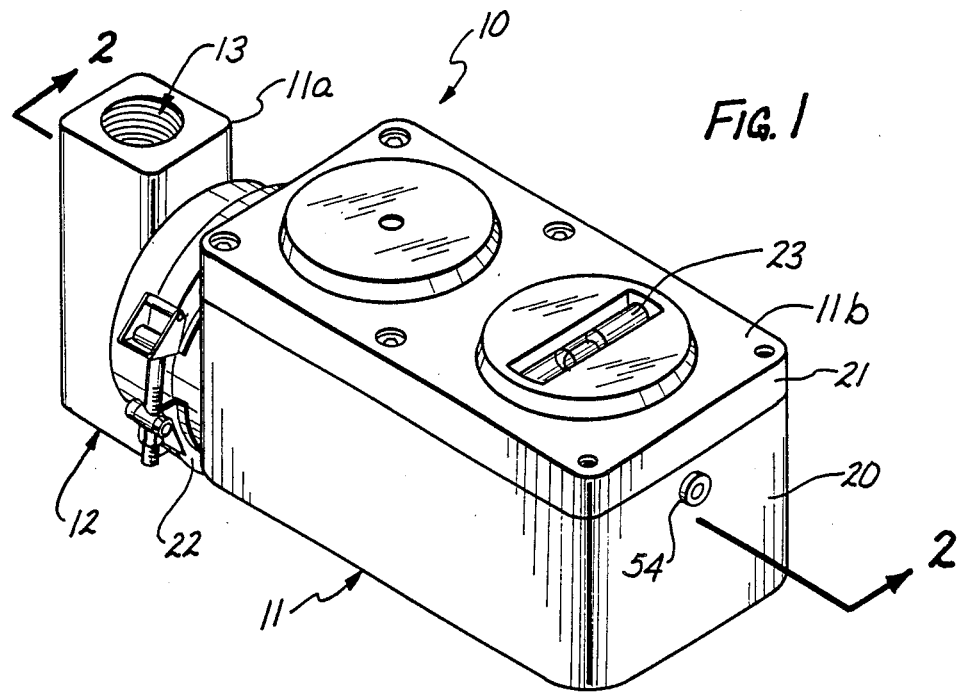
FIG. 1 of the drawings is a perspective view of a safety valve constructed according to the invention.
Figure 2:
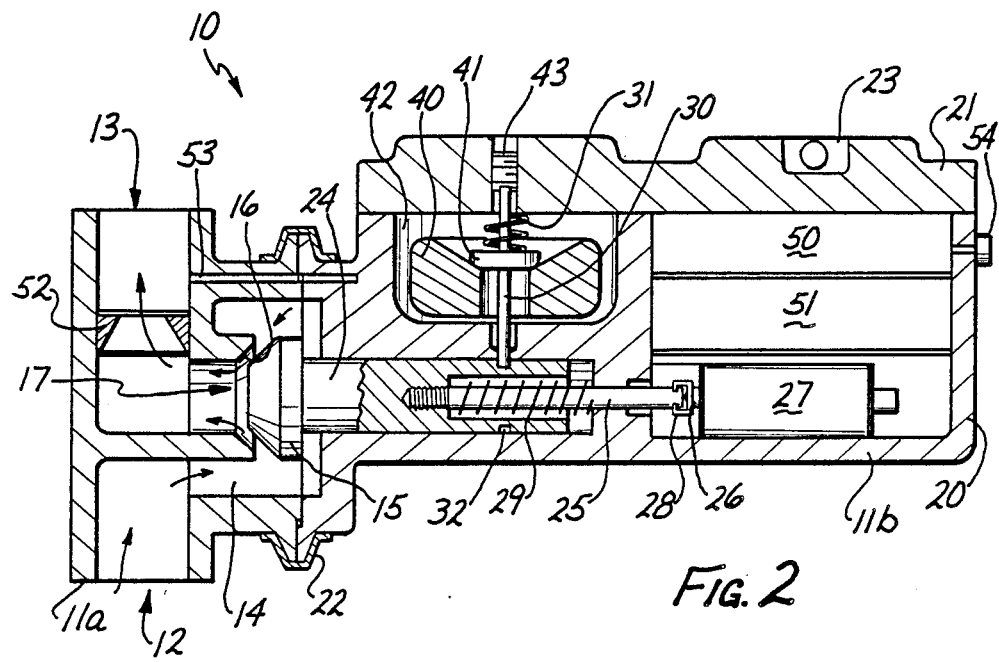
FIG. 2 is an enlarged cross sectional view of the safety valve taken on line 2–2 of FIG. 1 with the valve member in the open position.

The drawings show a valve assembly or valve 10 constructed according to the invention. Generally, the valve 10 includes a housing 11 (FIGS. 1 and 2) that is fabricated according to known techniques from a suitable material such as a metal alloy to have a valve section 11a (FIGS. 1, 2, and 4) and a control section 11b (FIGS. 1 and 2). As an idea of size, the housing 11 may measure about six inches long (15.24 cm), three inches wide (7.62 cm), and three inches deep (7.62 cm). Of course, those dimensions are not critical.

The valve section 11a includes an inlet 12, an outlet 13, and a passageway 14 (FIG. 2) that connects the inlet 12 and the outlet 13 in fluid communication, the inlet 12 for the illustrated embodiment being arranged conventionally to enable connection to a natural gas main (not shown) and the outlet 13 being arranged conventionally to enable connection to another natural gas line leading to the customer's gas-consuming device (not shown). Of course, the inlet 12 and outlet 13 could be configured differently than illustrated, using flange couplers, for example, for connection to the flange couplers often encountered in industrial installations, all without departing from the inventive concepts disclosed In addition, the valve 10 includes a valve member 15 (FIGS. 2, 3, and 4). It may be composed of a rubber composition, for example, and it is mounted on the housing 11 for movement between and open position or open state as shown in FIG. 2 and a closed position or closed state as shown in FIG. 3. In the open position, the valve member 15 is spaced apart from a valve seat 16 surrounding an opening or port 17 so that the port 17 and the passageway 14 are open in the sense that the flow of a fluid from the inlet 12 to the outlet 13 is not blocked. In the closed position, the valve member 15 is seated against the valve 16 so that the port 17 and the passageway 14 are closed in the sense that the flow of the fluid is blocked.

The components so far described function in a conventional manner in some respects. In other words, the valve member 15 controls a flow of natural gas (or other fluid) through the valve 10 to the extent of turning it on and off. According to a major aspect of the invention, however, the valve 10 also includes valve member actuation means for causing the valve member 15 to close the port 17 and thereby the passageway 14 automatically in the event of an earthquake (i.e., without an operator). For that purpose, the valve member actuation means is configured so that it is responsive to movement such as may accompany an earthquake (e.g., accelerated movement of the housing of predetermined magnitude), and based upon the foregoing and subsequent descriptions, one skilled in the art can arrange the various components of the valve 10 to respond to a predetermined amount of movement in order to close the valve only under predetermined conditions, such as only in the event of an earthquake of sufficient magnitude.

In the valve 10, the control section 11b of the housing 11 includes a main body portion 20 and a cover portion 21 (FIGS. 1 and 2). The cover portion 21 is secured to the main body portion 20 by suitable means such as screws, and together the main body portion 20 and the cover portion 21 contain the valve member actuation means. In addition, the control portion 11b of the housing 11 is secured to the valve section 11a with a clamp 22 so that the control section 11b can be leveled. That is done after the valve section 11a has been connected (typically between the natural gas main and the gas meter at the customer site) by loosening the clamp 22 and then rotating the control section 11b relative to the valve section 11a until a bubble level 23 in the cover portion 21 indicates a level position (FIGS. 1 and 2).

Once installed and leveled, the user opens the valve 10 by opening the port 17 and thereby the passageway 14. That is done by moving the valve member 15 to the open position shown in FIG. 2. In that regard, the valve member 15 is connected to a piston member 24 that couples the valve member 15 via a threaded shaft 25 to a moveable core 26 of a known type of solenoid 27. For that purpose, the threaded shaft 25 screws into the piston member 24 and it is suitably coupled to the moveable core 26 by know means such as a fork coupler member 28 (FIGS. 2 and 3).

The solenoid 27 may be any electromechanical device suitable for moving the valve member 15, and it is suitably connected by known means to a power source, such as the battery-powered microprocessor subsequently described. Energizing the solenoid 27 causes it to pull the valve member 15 from the closed position shown in FIG. 4 to the open position shown in FIG. 2. It does so against the force of a spring 29 (FIGS. 2 and 3), the spring biasing the valve member 15 toward the closed position and thereby serving as driving means for driving the valve member from an open position to a closed position. Of course, suitable components could be provided to enable a user to manually move the valve member 15 to the open position, either instead of or in conjunction with the solenoid 27. So in a larger sense, the solenoid 27 serves as means for resetting or reopening the valve 10 (i.e., recocking the valve member actuation means).

In the valve 10, the valve member actuation means includes both driving means as already described and a trigger mechanism. The trigger mechanism is responsive to movement such as may accompany an earthquake, serving the function of holding the valve member 15 in the open position until the occurrence of such movement and then enabling the valve member 15 to move to the closed position under influence of the driving means.

In that regard, the trigger mechanism in the valve 10 includes a retainer member 30 for retaining the valve member 15 in the open position. The retainer member 30 is mounted on the housing 11 for movement between a first position as shown in FIG. 2 in which the retainer member 30 restrains the valve member 15 from moving to the closed position under influence of the driving means and a second position as shown in FIG. 3 in which the retainer member 30 does not so restrain the valve member 15.

The retainer member 30 is spring biased toward the first position by a spring 31. When in the first position, the retainer member 30 seats in an annular groove 32 in the piston member 24 and that restrains the valve member 15 from moving to the closed position. In the second position, the retainer member 30 is withdrawn from the annular groove 32 as depicted by an arrow 33 in FIG. 3 and that allows the valve member 15 to move to the closed position under influence of the spring 29 as depicted by the arrows 34 and 35.

In addition, the trigger mechanism includes a body of material mounted on the housing for movement relative to the housing in response to movement such as may accompany an earthquake. In the valve 10, it takes the form of a toroidally shaped weight 40 mounted coaxially over the retainer member 30 (FIG. 2). The weight 40 may weigh about one-half pound, for example, and it sits generally unrestrained in a cavity 42 so that movement such as may accompany an earthquake moves or accelerates the main body portion 11b of the housing 11 relative to the weight 40 with the result that the weight 40 bears against a flange 41 attached to the retainer member 30. That tends to move the retainer member 30 to the second position.

The flange 41 serves as means for coupling the body of material to the retainer member so that the retainer member moves to the second position in the event of the movement such as may accompany an earthquake.

When the earthquake is severe enough and relative movement sufficient, the weight 40 causes the retainer member to move to the second position so that the valve member 15 moves to the closed position. An adjustment screw 43 (FIG. 2) enables the user to adjust the amount of spring biasing applied to the retainer member 30 in order to adjust the amount of movement required to automatically close the valve 10.

Another advantage of the trigger mechanism just described is that when earthquake movement subsides, the trigger mechanism returns to a untriggered state in which the weight 40 is not forcing the retainer member 30 toward the second position. As a result, the retainer member 30 is again spring biased toward the first position sufficiently that when the valve member 15 is moved to the opened position, the retainer member 30 again seats in the groove 32 (i.e., it drops back into the groove 32). Therefore, a user need not intervene in order to reset or reopen the valve 10, other than to cause the valve member 15 to move to the open position, and, preferably, that can be done remotely as subsequently described According to another aspect of the invention, there is provided control means on the housing 11 for enabling a user to control the valve 10 remotely. In other words, the user can control at least one of various valve functions from a location remote to the valve 10, such as opening the valve or sensing the pressure of a fluid in the valve 10. Valve state can be also be determined by suitable known such as sennsing the position of the core 24 of the solenoid 27. Preferably, those things are accomplished with microprocessor circuitry that includes a known microprocessor 50 and battery 51 (FIGS. 2 and 5). Those components are mounted on the housing 11 and suitably interconnected electrically according to known techniques with the solenoid 27, a pressure sensor device 53, and a flow meter sensor device 53. A connector 54 on the housing 11 is suitably connected to the microprocessor 50 also so that the user can connect a central computer 55 to the valve 10 over telephone lines 56 as depicted in FIG. 5, that arrangement resulting in a safety valve system 100. Utilizing suitable programming, the user can individually access and control each of a plurality of valves throughout a community without the time and expense of onsite visits.

Thus, the invention provides a safety valve for insertion between the gas main and the gas meter. It closes automatically in response to the movement accompanying an earthquake so that it prevents natural gas leakage even though the earthquake damages the gas meter, the customer lines, the gas-consuming devices, or any other downstream component. In addition, it includes electronic control circuitry with which a user can perform various functions such as monitoring gas pressure, determining valve state (open or closed), and changing valve state when desired.

What is claimed:

1. A valve, comprising:
   a housing having an inlet, an outlet, and a passageway that connects the inlet and the outlet in fluid communication;
   means defining a valve member on the housing for opening and closing the passageway;
   valve member actuation means on the housing responsive to movement such as may accompany an earthquake for causing the valve member to close the passageway automatically in the event of such movement; and
   means defining a solenoid on the housing for moving the valve member from the closed position to the open position in order to reopen the passageway;
   wherein the valve member actuation means includes driving means for driving the valve member from an open position to a closed position and means defining a trigger mechanism responsive to movement such as may accompany an earthquake for holding the valve member in the open position until the occurrence of such movement and then enabling the valve member to move to the closed position under influence of the driving means; and
   wherein the driving means and the means defining a trigger mechanism are mounted on the housing apart from the passageway.

2. A valve as recited in claim 1, wherein the valve member actuation means includes:
   means for enabling a user to adjust the amount of movement required to cause the valve actuation means to cause the valve member to close the passageway automatically in the event of such movement.

3. A valve a recited in claim 1, wherein the trigger mechanism includes:
   means defining a retainer member for retaining the valve member in the open position, which retainer member is mounted on the housing for movement between a first position in which the retainer member restrains the valve member from moving to the closed position under influence of the driving means and a second position in which the retainer member does not so restrain the valve member;
   a body of material mounted on the housing for movement relative to the housing in response to movement such as may accompany an earthquake; and
   means for coupling the body of material to the retainer member so that the retainer member moves to the second position in the event of the movement such as may accompany an earthquake.

4. A valve as recited in claim 3, wherein the valve member actuation means is so configured that the body of material moves between an untriggered position and a triggered position and so that the body of material returns to the untriggered position when the movement subsides.

5. A valve as recited in claim 4, wherein the body of material is toroidally shaped.

6. A valve as recited in claim 1, further comprising microprocessor means on the housing for enabling a user to control the solenoid.

7. A valve as recited in claim 1, further comprising means defining a sensor device for producing a signal indicative of the pressure of a fluid in the passageway.

8. A valve as recited in claim 7, further comprising microprocessor means on the housing for enabling a user to monitor the sensor device.

9. A valve, comprising:
   a housing having an inlet, an outlet, and a passageway that connects the inlet and the outlet in fluid communication;
   means defining a valve member on the housing for opening and closing the passageway;
   valve member actuation means on the housing responsive to movement such as may accompany an earthquake for causing the valve member to close the passageway automatically in the event of such movement; and control means mounted on the housing for enabling a user to control the valve remotely.

10. A valve as recited in claim 9, wherein the control means is configured to monitor the pressure of a fluid in the passageway and to cause the valve member to move from a closed position to an open position in order to reopen the passageway.

11. A valve as recited in claim 9, wherein the control means includes microprocessor circuitry.

12. A valve as recited in claim 11, wherein the microprocessor circuitry is battery powered.

13. A valve as recited in claim 1, wherein the means defining a trigger mechanism is configured to respond to such movement in any of three mutually perpendicular directions.

14. A valve, comprising:
a housing having an inlet, an outlet, and a passageway that connects the inlet and the outlet in fluid communication;
means defining a valve member on the housing for opening and closing the passageway;
valve member actuation means on the housing responsive to movement such as may accompany an earthquake for causing the valve member to close the passageway automatically in the event of such movement; and
control means mounted on the housing for enabling a user to reopen the passageway remotely.

15. A valve as recited in claim 14, wherein the control means includes microprocessor circuitry.

16. A valve as recited in claim 15, wherein the control means is configured to communicate with a separate computer over conventional telephone lines.

17. A valve system, comprising:
a plurality of valves connected in natural gas lines; and
computer means for controlling the valves;
at least one of the plurality of valves comprising:
a housing having an inlet, an outlet, and a passageway that connects the inlet and the outlet in fluid communication;
means defining a valve member on the housing for opening and closing the passageway;
valve member actuation means on the housing responsive to movement such as may accompany an earthquake for causing the valve member to close the passageway automatically in the event of such movement; and
control means mounted on the housing for enabling a user to reopen the passageway remotely.

18. A valve system as recited in claim 17, wherein the control means is configured to enable a user to monitor the pressure of a fluid in the passageway.

19. A valve system as recited in claim 17, wherein the control means is configured to enable a user to determine whether the passageway is open or closed.

20. A valve, comprising:
a housing having an inlet, and outlet, and a passageway that connects the inlet and the outlet in fluid communication;
means defining a valve member on the housing for opening and closing the passageway; and
valve member actuation means on the housing responsive to movement such as may accompany an earthquake for causing the valve member to close the passageway automatically in the event of such movement;
wherein the valve member actuation means includes driving means for driving the valve member from an open position to a closed position and means defining a trigger mechanism responsive to movement such as may accompany an earthquake for holding the valve member in the open position until the occurrence of such movement and then enabling the valve member to move to the closed position under influence of the driving means;
wherein the driving means and the means defining a trigger mechanism are mounted on the housing apart from the passageway; and
wherein the housing includes a valve section and a control section that are configured to enable adjustment of the position of the control section relative to the valve section for purposes of leveling the control section.

21. A valve as recited in claim 22, wherein the means defining a trigger mechanism is configured to respond to movement such as may accompany an earthquake movement in any of three mutually perpendicular directions.

22. A valve as recited in claim 22, wherein:
the means defining a trigger mechanism includes means defining a retainer member for retaining the valve member in the open position, a body of material mounted on the housing for movement relative to the housing in response to movement such as may accompany an earthquake, and means for coupling the body of material to the retainer member; and
the valve means defining a trigger mechanism is so configured that the body of material moves between an untriggered position and a triggered position in response to the movement and so that the body of material returns to the untriggered position when the movement subsides.

* * * * *

UNITED STATES PATENT AND TRADEMARK OFFICE
CERTIFICATE OF CORRECTION

PATENT NO. : 4,971,094

DATED : Nov. 20, 1990

INVENTOR(S) : Ernest R. Gonzalez

It is certified that error appears in the above-identified patent and that said Letters Patent is hereby corrected as shown below:

Column 8, lines 35 and 40, change "claim 22" to --claim 20--.

Signed and Sealed this

Seventh Day of April, 1992

Attest:

HARRY F. MANBECK, JR.

*Attesting Officer*  *Commissioner of Patents and Trademarks*